July 10, 1934.  C. O. YOUNG  1,966,157
PROCESS FOR MAKING NORMAL BUTANOL
Filed Dec. 7, 1931
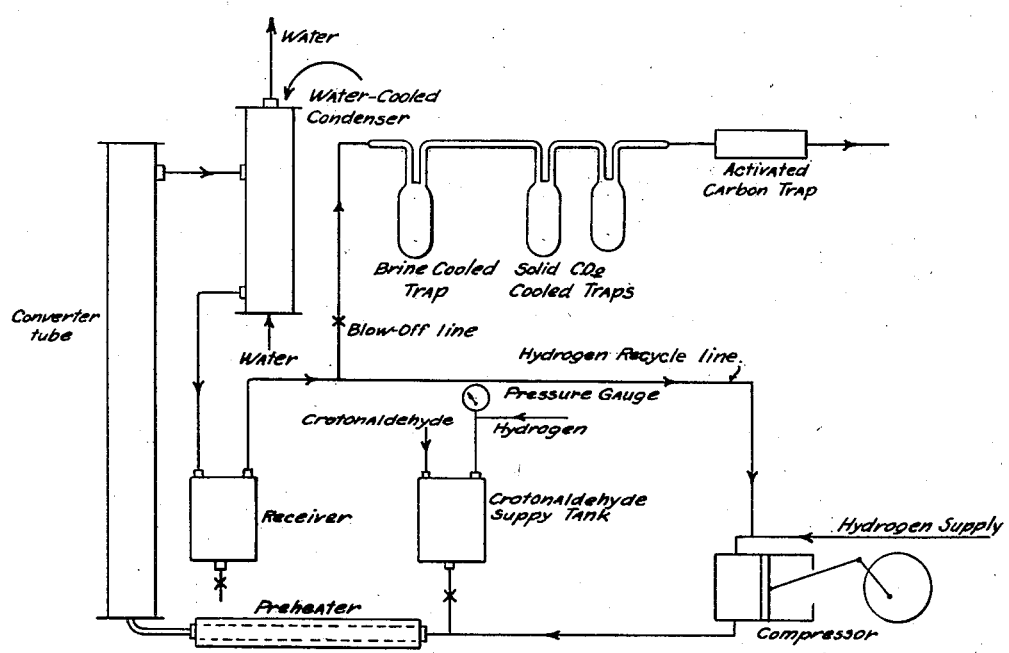
INVENTOR:
Charles O. Young, Deceased,
By Morian K. Young, Executrix,
BY Byrnes, Townsend & Potter,
ATTORNEYS.

Patented July 10, 1934

1,966,157

UNITED STATES PATENT OFFICE 1,966,157

PROCESS FOR MAKING NORMAL BUTANOL

Charles O. Young, deceased, late of Charleston, W. Va., by Marion K. Young, executrix, Charleston, W. Va., assignor to Carbide & Carbon Chemicals Corporation, a corporation of New York Application December 7, 1931, Serial No. 579,572

6 Claims. (Cl. 260—156)

The invention is a process for making n-butanol, $CH_3.CH_2.CH_2.CH_2OH$, from crotonaldehyde, $CH_3.CH:CH.CHO$. The process broadly comprises hydrogenating crotonaldehyde by the aid of a novel catalytic material and under appropriate conditions of temperature and pressure, and with certain proportions of the reacting materials, all as more fully hereinafter disclosed.

The principal objects of the invention are to provide a process for making n-butanol which is economical and efficient in operation, and to provide a new and improved catalyst which may be utilized in the process.

The catalyst which is employed to attain these objects consists of reduced metallic nickel together with some chromium supported on an inert carrier. It is probable that the chromium in the catalyst is not reduced but is present as an oxide, most probably $Cr_2O_3$. Throughout this specification and the appended claims it is to be understood that percentage proportions of chromium expressed in describing the new catalysts indicate the chromium, however present, calculated as the element and based on the weight of nickel present.

The process is conducted by passing crotonaldehyde vapor together with hydrogen over the catalyst. The issuing products are condensed and collected. The collected condensate contains n-butanol and may contain some butyraldehyde which may be separately recovered therefrom. The excess hydrogen may be recirculated and reused in the system, and an advantageous feature of the present process resides in the fact that it may be so practiced as to give a product containing substantially no unchanged crotonaldehyde.

The following is a description of one method of practicing the invention, and is illustrated by the accompanying diagrammatic drawing.

The catalyst used consisted of reduced nickel together with 2.15% Cr based on the weight of nickel supported on chips of porous artificial filter stone composed essentially of silica. The chips were screened to size between 1/8 and 1/16 inch mesh screens.

The catalyst was placed in a vertical converter tube which was heated electrically. The crotonaldehyde used was water saturated, i. e. about 93% crotonaldehyde and 7% water. It was kept in a supply tank under hydrogen pressure and fed to the converter through a preheater where it was vaporized. The hydrogen was supplied from a gas holder and pressure was supplied thereto by a compressor in the hydrogen feed line. The hydrogen entered the preheater with the crotonaldehyde. The crotonaldehyde vapor-hydrogen mixture entered the bottom of the converter tube and passed therethrough. The issuing products were condensed by a water cooled condenser and were collected in a receiver. The excess hydrogen was returned from the receiver to the suction side of the compressor. A blow-off was provided in the hydrogen return line by which the gas could be taken from the system through a series of cold traps, brine and solid carbon dioxide cooled, and through a final trap filled with activated carbon. The condensate collected in the receiver was then fractionally distilled to separately recover n-butanol.

Operating data follows:

| Run No. | 1 | 2 | 3 |
|---|---|---|---|
| Duration (hours) | 12 | 12 | 12 |
| Pressure (lbs. gage) | 30 | 30 | 30 |
| Rate of feed (g./hr.) | 510 | 588 | 926 |
| Temperature: | | | |
| Preheater (° C.) | 110 | 105 | 107 |
| Converter (° C.) | 180–186 | 184–189 | 193 |
| Wet crotonaldehyde fed (g.) | 6116 | 7060 | 10647 |
| Contained crotonaldehyde (g.) | 5680 | 6560 | 9900 |
| Contained water (g.) | 436 | 500 | 747 |
| Condensate recovered (g.) | 6340 | 7297 | 11012 |
| Contained butyraldehyde (g.) | | | 331 |
| Contained n-butanol (g.) | 5780 | 6650 | 9745 |
| Contained water (g.) | 560 | 647 | 936 |
| Crotonaldehyde equivalent of butyraldehyde (g.) | | | 321 |
| Crotonaldehyde equivalent of n-butanol (g.) | 5470 | 6280 | 9220 |
| Overall yield (%) | 96.3 | 95.8 | 93.3 |
| Efficiency (%) | 98.3 | 95.8 | 96.4 |
| Production ratio (g.n-butanol/l.catalyst/hr.) | 38.6 | 44.5 | 68.1 |

In these runs 70 mols of hydrogen per mol of crotonaldehyde were passed through the converter.

The process may be varied considerably in operation. In general, temperatures of about 170° to about 210° C. are suitable for the process and pressures ranging from atmospheric pressure to about 75 pounds per square inch of gage pressure may be used. Within these limits, a temperature of about 180° C. and about 30 pounds of gage pressure are preferred conditions.

The rate of feed controls the formation of butyraldehyde the latter increasing as the rate of feed increases. In practically every instance in which the process was operated under the conditions set forth, no unchanged crotonaldehyde could be detected in the products after hydrogenation.

The catalyst may contain from about 1% to about 5% of chromium based on the weight of nickel. A convenient method of preparing a suitable catalyst is by impregnating an inert carrier or support with a solution containing soluble nickel and chromium salts in approximately the proportions desired. The impregnated material is then roasted in a blast of heated air, and reduced with hydrogen.

The following example is illustrative of a preferred method of preparing the catalyst.

Chips of artificial porous filter stone composed essentially of silica were screened to size between ⅛ and 1/16 inch mesh screens. A portion of the sized chips sufficient to fill the converter tube was then immersed in a concentrated solution prepared by dissolving $Ni(NO_3)_2.6H_2O$ and $Cr(NO_3)_3.9H_2O$ in the ratio of about 95 parts by weight of the former to about 5 parts by weight of the latter salt. The impregnated chips were then drained, dried, and roasted in a blast of air heated to about 600° C. The roasting was continued until the evolution of nitric oxide fumes ceased. The roasted material was then placed in the converter tube and reduced at about 400° C. with hydrogen. The catalyst so prepared contained about 11% of total metals, and the ratio of Ni to Cr was 97.8 to 2.2.

The life of catalysts of the type disclosed herein is exceptionally long. The catalyst described above was used for over 200 hours and showed practically no decrease in activity as indicated by the production ratio, i. e. grams of n-butanol produced per liter of catalyst per hour. Also, the catalyst may be restored to its original activity by passing an oxidizing blast of air therethrough, followed by re-reduction with hydrogen. By way of comparison, it was found that the new catalysts gave production ratios which were from 1.5 to more than 2 times as great as those obtained with ordinary nickel catalysts under the same conditions.

What is claimed is:—

1. Process for making n-butanol from crotonaldehyde which comprises passing crotonaldehyde vapors and hydrogen in the molar ratio of about 1 to about 70—over a catalyst at about 170° to about 210° C. and at a gage pressure of about 25 to about 60 pounds per square inch, said catalyst consisting of reduced nickel together with from about 1% to 5% chromium supported on an inert carrier.

2. Process for making n-butanol from crotonaldehyde which comprises passing crotonaldehyde vapors and hydrogen over a catalyst at about 170° to about 210° C. and at a gage pressure of about 25 to about 60 pounds per square inch, said catalyst consisting of reduced nickel together with from about 1% to 5% chromium supported on an inert carrier.

3. Process for making n-butanol from crotonaldehyde which comprises passing crotonaldehyde vapors and hydrogen over a catalyst at about 180° C. and at a gage pressure of about 30 pounds per square inch, said catalyst consisting of reduced nickel together with from about 1% to 5% chromium supported on an inert carrier.

4. Process for making n-butanol from crotonaldehyde which comprises passing crotonaldehyde vapors and hydrogen over a catalyst at about 180° C. and at a gage pressure of about 30 pounds per square inch, said catalyst consisting of reduced nickel together with about 2% chromium supported on an inert carrier.

5. Process for making n-butanol from crotonaldehyde which comprises passing crotonaldehyde vapors and hydrogen in the molar ratio of about 1 to about 70 over a catalyst at about 180° C. and at a gage pressure of about 30 pounds per square inch, said catalyst consisting of reduced nickel together with about 2% chromium supported on an inert carrier.

6. A hydrogenating catalyst consisting of reduced nickel together with from about 1% to 5% chromium supported on an inert carrier, said catalyst being substantially identical with a catalyst obtained by impregnating a porous inert carrier with a concentrated solution containing soluble salts of nickel and chromium in the approximate proportions of 90 to 99 parts nickel salt and 1 to 10 parts chromium salt, drying and roasting said impregnated carrier in a blast of air heated to between 400° and 700° C., and reducing said roasted material with hydrogen at about 400° C.

MARION K. YOUNG.
*Executrix of the Last Will and Testament of Charles O. Young, Deceased.*